United States Patent Office 3,479,510
Patented Nov. 18, 1969

3,479,510
FERROELECTRIC INFRARED IMAGE TRANSLATOR
Clement F. Baumberger and Francois Micheron, Paris, France, assignors to CSF-Compagnie Generale de Telegraphie Sans Fil, a corporation of France
Filed Apr. 16, 1968, Ser. No. 721,792
Claims priority, application France, Apr. 21, 1967, 103,751
Int. Cl. H01j 39/02
U.S. Cl. 250—83.3   16 Claims

ABSTRACT OF THE DISCLOSURE

A system for providing on a screen a visible image of an object emitting infrared radiation comprising a body of ferroelectric material at a temperature near its Curie point, which is submitted to this radiation. Optical means are provided for directing luminous rays upon said body and, therefrom, on said screen through an arrangement responsive to the variation of refraction indices of said body.

---

The present invention which relates to infrared image translators, is based on the variation of the refraction indices of ferroelectric materials as a function of various parameters, when the temperature is near the Curie point of these materials.

It is an object of the invention to provide an arrangement for providing a visible image of objects emitting infrared radiations.

According to the invention there is provided an arrangement for providing a visible image of an object emitting infrared radiation, comprising: a source of luminous rays; a screen; a body of ferroelectric material; optical means for directing said luminous rays on said body and, therefrom, on said screen; means for maintaining said body near the Curie temperature of said ferroelectric material; and means responsive to the variations of refraction indices of said body, positioned on the path of said luminous rays, from said body to said screen, upon impact of infrared rays on said body.

For a better understanding of the invention and to show how the same may be carried into effect, reference will be made to the drawings accompanying the following description and in which.

Figure 1:
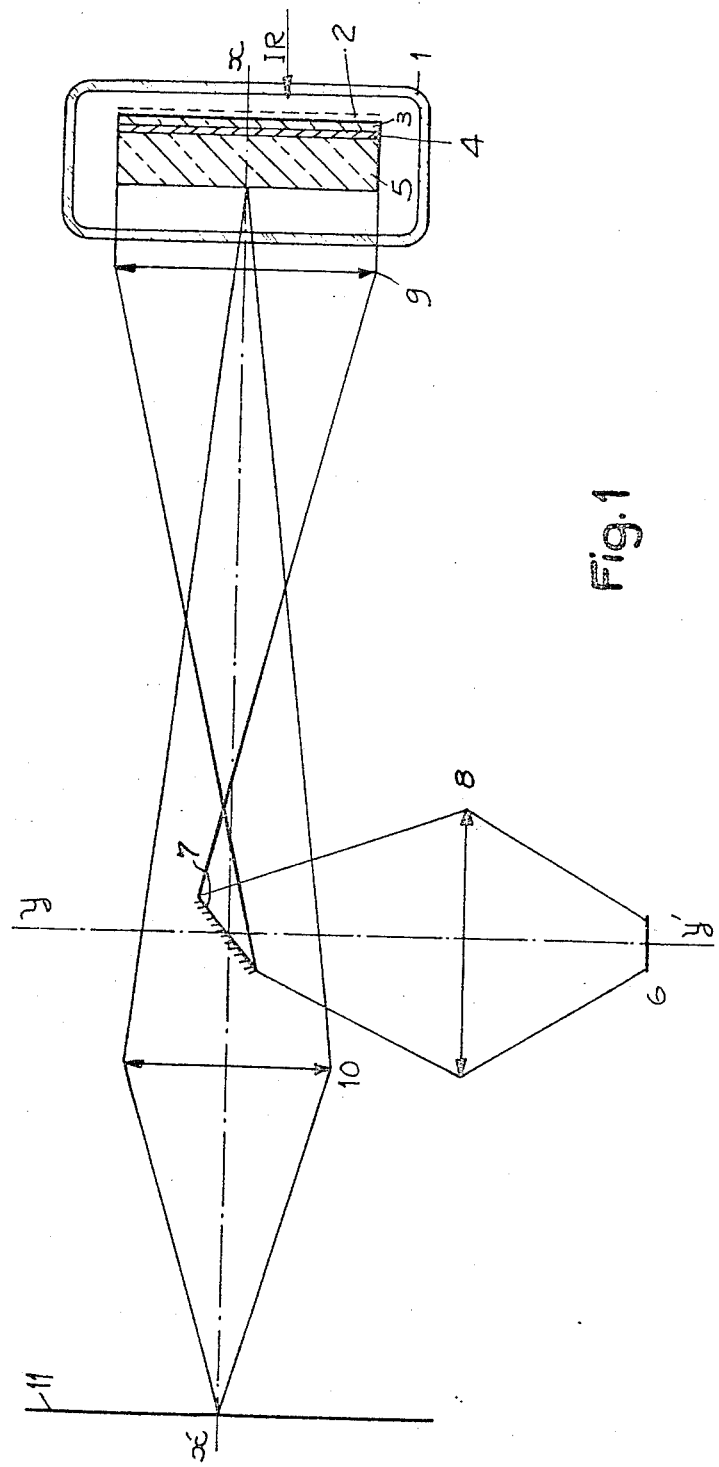
FIGS. 1 to 7 show diagrammatically various embodiments of the invention.

The arrangement shown in FIG. 1 comprises a tight enclosure 1, made of a transparent material, in which is located a sheet of material 3, which absorbs the infrared rays IR and on which a grid 2 is deposited.

The grid is made, for example, of bars of a material absorbing infrared and which are perpendicular to the plane of the drawing. A mirror 4 is disposed on the opposite side of the sheet 3. On the other side of the mirror is placed a ferroelectric body 5. This body is birefringent. Its two refraction indices are $n_e = n_e(T)$ and $n_o = n_o(T)$, T being the absolute temperature. Means are provided for maintaining the enclosure 1 at a temperature near the Curie point of the ferroelectric material 5.

In front of the body 5 is placed a mirror arrangement 7. This arrangement is formed by a plate formed of alternating transparent and reflecting strips, as well known in the art. The plate is perpendicular to the plane of the drawing and inclined at 45° to the axis $x'$—$x$ of the plate 5 and to the axis $y'$—$y$, which is normal to a slit 6 which, through a lens 8, illuminates the mirror 7.

A lens 9 is placed in front of the plate 5 and is coaxial therewith. On the opposite side of mirror 7 is placed a screen 11 and a lens 10 is placed between the screen 11 and the mirror 7.

The operation of the assembly is as follows:

If the ferroelectric body 5 is homogenous, the luminous radiation from the slit 6, after reflection from the reflecting strips of the mirror arrangement 7, passage through the lens 9, reflection from the mirror 4, and further passage through the lens 9, is concentrated on the reflecting strips of the mirror 7. No light reaches the screen 11. If, on the other hand, infrared rays arrive in the direction of the arrow IR, and give rise to a non-homogenous distribution of the temperature within the ferroelectric body 5, the luminous rays leave the zone 5 after having undergone different phase shifts which depend on this temperature. Thus, as is known, an image formed by the lens 10 appears on the screen 11, and translates the variations of the phase shifts into amplitude difference, in which the most illuminated zones correspond to the hottest zones of the body 5.

Figure 2:
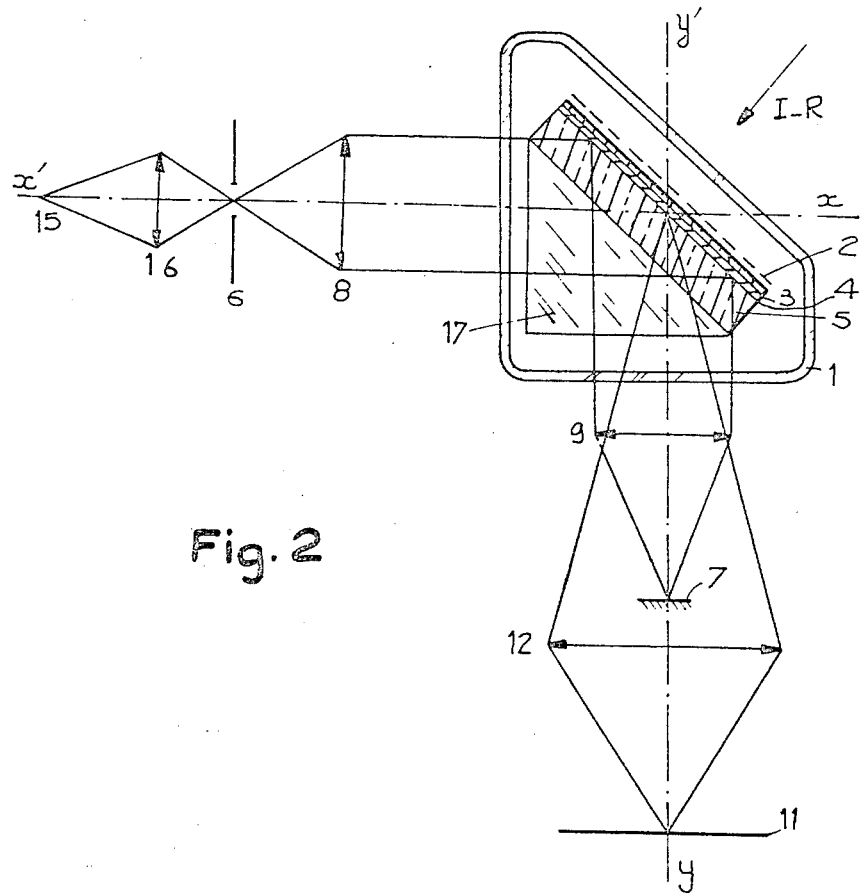

FIG. 2 shows an arrangement based on the same principle. The same reference numerals designate the same parts.

A source of light 15 illuminates the slit 6 across a lens 16. The assembly 3, 4, 5 is arranged on the face of a prism 17 which is inclined at 45° to the axes $x'$—$x$ of the lenses 16 and 18 and $y'$—$y$ of the lenses 9 and 12 mirror 7 and screen 11, which axes are perpendicular to each other. The infrared radiation arrives at this surface in the direction of the arrow IR, perpendicularly to the ferroelectric plate 5.

The following figures describe an arrangement based on the following principle.

A ferroelectric plate is birefringent and has two indices of refraction $n_e$ and $n_o$. The difference $\Delta n = n_e - n_o = f(T)$ is particularly pronounced near the Curie point. An infrared image is therefore translated in such a plate into variations in the birefringence.

Figure 3:
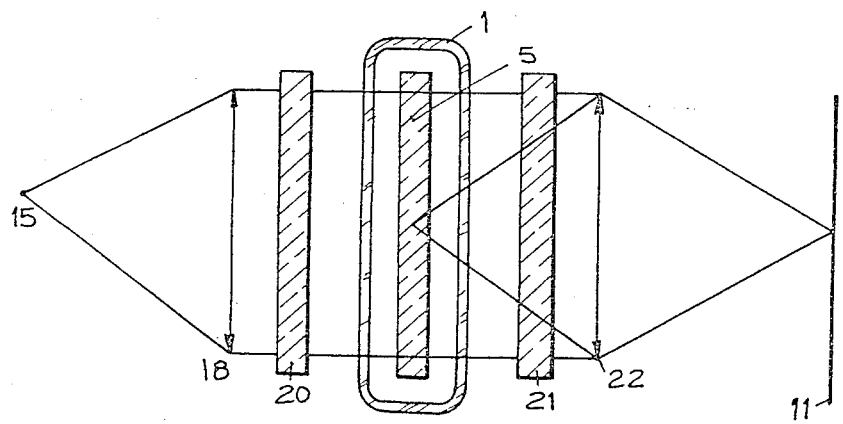

An assembly, such as that shown in FIG. 3, sets forth these changes and translates them into a visible image on the screen.

In FIG. 3 a source of light 15, placed at the focus of a lens 18 illuminates a polarizer 20, located in front of the ferroelectric plate 5. Behind this plate, there is placed an analyzer 21, which illuminates a lens 22 which concentrates the light rays on a screen 11.

An infrared radiation illuminates the plate 5, which is located in an envelope 1 wherein the temperature is maintained near the Curie point. The polarizer and the analyzer are so oriented that, taking into account the thickness of the plate 5, the screen 11 receives no radiation in the absence of infrared radiation. The appearance of the infrared rays forms zones which are more or less hot in the plate 5.

This results in changes of $n_e - n_o$ and hence in differential illumination of the screen 11, which translates in a visible image the infrared light.

Figure 4:
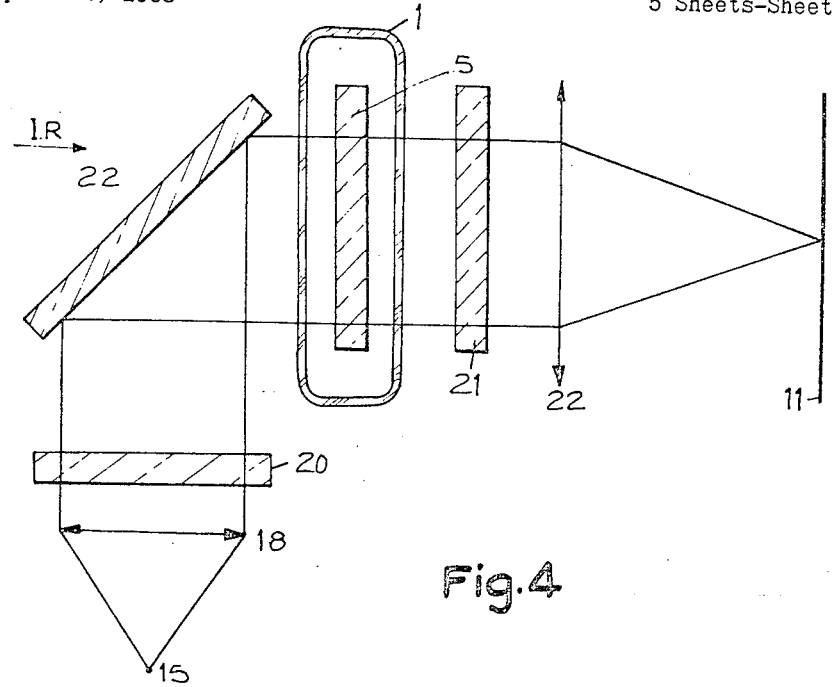

FIG. 4 shows an arrangement in which the infrared rays and the light rays are introduced separately through a plate 22, which is transparent to infrared radiation and reflects light rays. The plate 22 is inclined at 45° to the common axis of the polarizer 20 and the lens 18 and to the common axis of the plate 5, the analyzer 21 and the lens 22, these two axes being perpendicular to each other.

Figure 5:
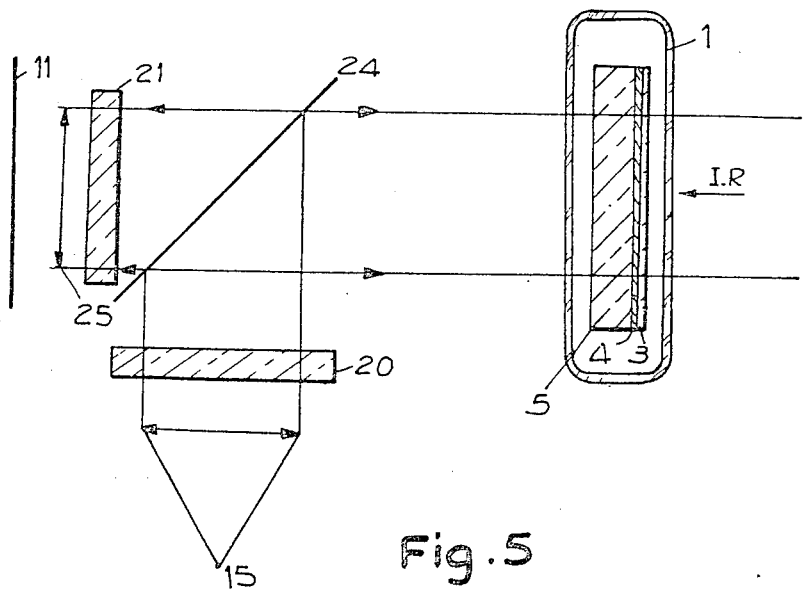

FIG. 5 shows a modification, in which the ferroelectric plate 5 does not absorb the infrared rays sufficiently.

The plate 5 is, as in FIG. 1, adjacent to the absorbing body 3. Between the plate 5 and the body 3 is a mirror 4, which reflects the luminous rays. The infrared rays arrive in the indicated direction.

The semi-transparent plate 24 is mounted as shown. The polarizer 20 and the analyzer are mounted as shown.

A lens 25 concentrates the radiation coming from the analyzer onto the screen 11.

The embodiments described in the following are based on the following property.

Certain ferroelectric crystals, for example, those of $KH_2PO_4$ and $KD_2PO_4$, are uniaxial in the absence of any electric field. The index ellipsoid is of revolution about the ferroelectric axis $c$. If an electric field $E_c$ is applied along the axis $c$, this holds no longer true: the body becomes biaxial. The ellipsoid is no longer revolutional and its three axes are as follows:

the ferroelectric axis $c$;

axes $a'$ and $b'$, forming, with the former axis, a trirectangular trihedron.

It can be shown that the main indices, i.e. along the above axes of the ellipsoid are:

$n_c = n_e$, independent of of $E_c$, $n_{a'} = n_o - r_{63}E_c$, $n_{b'} = n_o + r_{63}$, $n_o$ being the index along the axes normal to the axis $c$, $r_{63}$ is the electro-optical modulus and is written $$r_{63} = \frac{K}{T - T_c}$$

where K is a constant, for T, a temperature higher than $T_c$, the Curie temperature.

It follows therefrom:

(a) For a luminous beam propagating along the axis $c$, the electric field vector is divided into two vectors, one along the axis $a'$ and the other along the axis $b'$.

These two fields are not propagated at the same velocity and there is an induced birefringence:

$$\Delta n_{a'b'} = n_{a'} - n_{b'} = 2r_{63}E_c = \frac{2K}{T - T_c} E_c$$

(b) For a luminous beam propagated along the axis $a'$ or $b'$, and for the same reasons, there will be birefringence and one can write $$\Delta n_{c'a'} = n_e - n_o + r_{63}E_c$$

Figure 6:
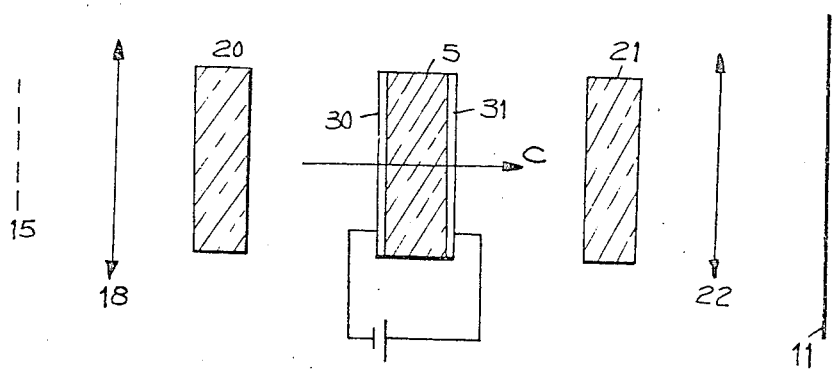

FIG. 6 shows an application of phenomenon (a); the arrangement is identical to that of FIG. 3 or the FIG. 4: the axis $c$ is parallel to the optical axis of the assembly, the transparent electrodes 30 and 31 form the field $E_c$ inside the sheet 5. The birefringence is indicated by the system 20 and 21 in FIG. 4.

Figure 7:
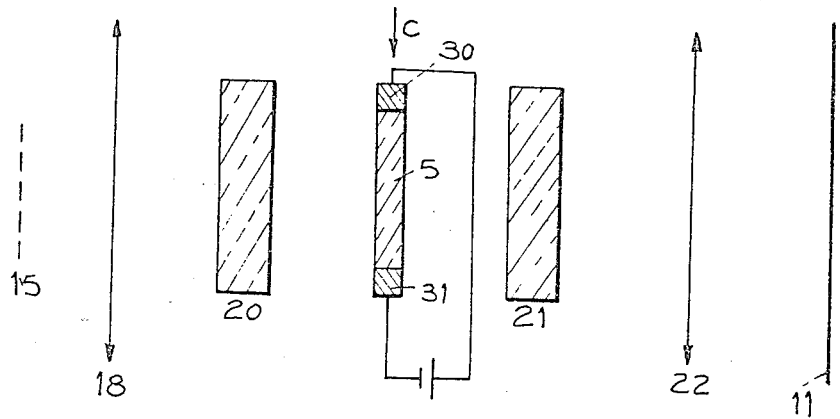
Figure 8:
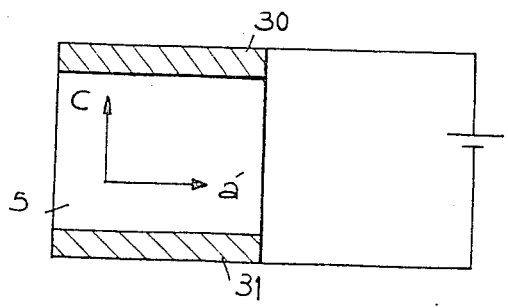
FIG. 8 shows a detail.

FIG. 7 is an application of the phenomenon (b). The axis $c$ is (FIG. 8) in the plane of the sheet and perpendicular to the optical axis of the assembly. The electrodes 30 and 31 are placed at the edges of the sheet.

Figure 9:
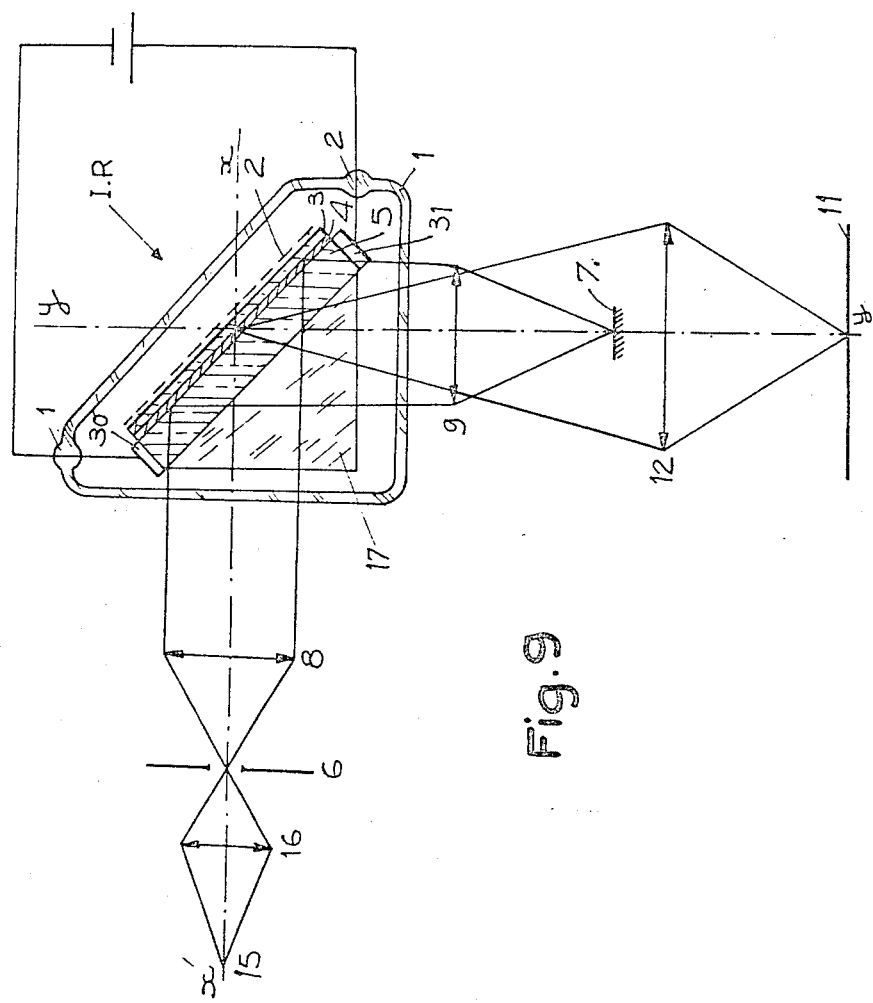
FIG. 9 shows a further embodiment of the invention.

FIG. 9 is derived from FIG. 2 and differs therefrom in that the two electrodes 30 and 31 are arranged at the two edges of the plate.

It is based on the fact that $$n_{a'} = n_o + \frac{K}{T - T_c} E_c$$

the so-called index variation phenomenon.

The field is applied to the plate by two electrodes. The plate is assumed to contain the axes $c$ and $a'$. This arrangement makes it possible to utilize non-transparent electrodes.

Of course, the invention is not limited to the embodiments described and shown which were given only by way of example.

What is claimed is:

1. An arrangement for providing a visible image of an object emitting infrared radiation comprising: a source of luminous rays; a screen; a body of ferroelectric material; optical means for directing said luminous rays on said body and, therefrom, on said screen; means for maintaining said body near the Curie temperature of said ferroelectric material; and means responsive to the variations of refraction indices of said body, positioned on the path of said luminous rays, from said body to said screen, upon impact of infrared rays on said body.

2. An arrangement as claimed in claim 1, wherein said variation responsive means are responsive to the variation of one refraction index of said body.

3. An arrangement as claimed in claim 2, wherein said variation responsive means comprise a first mirror comprising alternate parallel transparent and opaque strips, located between said body and said screen.

4. An arrangement as claimed in claim 3, wherein said optical means comprise a second mirror adjacent to said body.

5. An arrangement as claimed in claim 4, wherein said optical means further comprise: first lens means having a first axis extending through said source, forming on said first mirror, an image of said source, said first mirror being inclined at 45° to said first axis; said screen being parallel to said body, said ferroelectric body having a second axis perpendicular to said first axis and intersecting said first axis, on said first mirror; second lens means coaxial with said body located between said first mirror and said body and the combination of said second lens of said second mirror concentrating the luminous rays, after passage through said body and reflection on said second mirror, on said first mirror; and third lens means coaxial with said second lens means located between said strioscopic mirror and said screen.

6. An arrangement as claimed in claim 4, further comprising: a prism, having two faces having respective axes perpendicular to each other and a third face supporting said ferroelectric body, inclined at 45° to said axes, said axes intersecting at the center of said third face; said optical means further comprising first lens means, coaxial with one of said two faces, and second lens means coaxial with the other face and said first mirror, for forming an image of said source on said first mirror, after reflection on said second mirror, and third lens means coaxial with said first mirror, between said first mirror and said screen.

7. An arrangement as claimed in claim 1, wherein said means are responsive to the variation of the difference betwen two refraction indices.

8. An arrangement as claimed in claim 7, wherein said responsive means comprises a polarizer located between said source and said body, and an analyzer located between said body and said screen, said optical means forming an image of said source on said screen, through said polarizer, said body and said analyzer.

9. An arrangement as claimed in claim 8, wherein said polarizer and said analyzer are located on each side of said body and are parallel therewith, said optical means comprising first lens means having an axis perpendicular to said body and positioned between said source and said polarizer and second lens means coaxial with said first lens and positioned between said screen and said analyzer.

10. An arrangement as claimed in claim 8, wherein said optical means comprise: first lens means having an axis parallel to said body, a plate transparent to infrared radiation and reflecting the luminous rays, inclined at 45° to said axis, said polarizer being coaxial with said lens means and located between said lens means and said plate, said plate reflecting towards said body the luminous rays; said analyzer being parallel to said body and said screen, and second lens means coaxial therewith and located between said analyzer and said screen.

11. An arrangement as claimed in claim 10, wherein said optical means comprise a second mirror adjacent to said body.

12. An arrangement as claimed in claim 1, wherein said responsive means are responsive to the variations of at least one of the three principal indices of refraction of the ferroelectric material, means being provided for applying an electric field parallel to one of the axes of the index ellipsoids of the material.

13. An arrangement as claimed in claim 12, wherein said electric field providing means comprises two electrodes deposited on each side of said body for creating in said body a field in the direction of the ferroelectric axis thereof.

14. An arrangement as claimed in claim 13, comprising a polarizer located between said source and said body, an analyzer located between said body and said screen, said polarizer, said analyzer and said body having for axis the ferroelectric axis, said optical means comprising lens means located between said polarizer and said source and further lens means located between said analyzer and said screen.

15. An arrangement as claimed in claim 12, wherein said electric field producing means comprise two electrodes for directing in said body a field parallel to one of the axes of the index ellipsoid, perpendicular to the ferroelectric axis.

16. An arrangement as claimed in claim 15 comprising a polarizer located between said source and said body, an analyzer located between said body and said screen, said polarizer said analyzer and said body being coaxial with the other axis of the index ellipsoid perpendicular to the ferroelectric axis, said optical means comprising lens means located between said polarizer and said source, and a further lens means located between said analyzer and said screen.

References Cited

UNITED STATES PATENTS

| | | |
|---|---|---|
| 2,625,850 | 1/1953 | Stanton. |
| 2,824,235 | 2/1958 | Hahn et al. |
| 3,114,836 | 12/1963 | Fergason et al. _____ 250—83 |
| 3,158,430 | 11/1964 | McNaney _____ 350—161 X |

OTHER REFERENCES

Megaw, Ferroelectricity in Crystals, p. 70–71, 1957, Methuen & Co. Ltd., London.

RALPH G. WILSON, Primary Examiner

M. J. FROME, Assistant Examiner

U.S. Cl. X.R.

88—14; 250—213; 350—161